(12) United States Patent
Zimmermann et al.

(10) Patent No.: US 11,017,086 B2
(45) Date of Patent: May 25, 2021

(54) USING INDIRECTION TO FACILITATE SOFTWARE UPGRADES

(71) Applicant: CrowdStrike, Inc., Irvine, CA (US)

(72) Inventors: Cat S. Zimmermann, Lake Forest Park, WA (US); Steven King, Bellevue, WA (US)

(73) Assignee: CrowdStrike, Inc., Irvine, CA (US)

(*) Notice: Subject to any disclaimer, the term of this patent is extended or adjusted under 35 U.S.C. 154(b) by 623 days.

(21) Appl. No.: 15/721,508

(22) Filed: Sep. 29, 2017

(65) Prior Publication Data
US 2019/0102551 A1 Apr. 4, 2019

(51) Int. Cl.
| | | |
|---|---|---|
| *G06F 21/56* | (2013.01) | |
| *G06F 21/55* | (2013.01) | |
| *H04L 29/06* | (2006.01) | |
| *G06F 8/656* | (2018.01) | |
| *G06F 21/57* | (2013.01) | |
| *G06F 8/65* | (2018.01) | |
| *G06F 9/54* | (2006.01) | |

(52) U.S. Cl.
CPC .............. *G06F 21/566* (2013.01); *G06F 8/65* (2013.01); *G06F 8/656* (2018.02); *G06F 9/545* (2013.01); *G06F 21/55* (2013.01); *G06F 21/57* (2013.01); *H04L 63/14* (2013.01); *G06F 2221/033* (2013.01)

(58) Field of Classification Search
CPC .... G06F 21/50–577; G06F 8/65; G06F 8/656; G06F 9/545; H04L 63/14
See application file for complete search history.

(56) References Cited

U.S. PATENT DOCUMENTS

| | | | |
|---|---|---|---|
| 8,910,283 B1 | 12/2014 | Gusarov et al. | |
| 2008/0127292 A1* | 5/2008 | Cooper | G06F 21/53 726/1 |
| 2008/0184335 A1* | 7/2008 | Zhang | G06F 21/57 726/1 |
| 2011/0010756 A1* | 1/2011 | Choi | G06F 21/53 726/2 |

(Continued)

OTHER PUBLICATIONS

The Extended European Search Report dated Jan. 23, 2019 for European Patent Application No. 18196808.2, 7 pages.

*Primary Examiner* — Jeremy S Duffield
(74) *Attorney, Agent, or Firm* — Lee & Hayes, P.C.

(57) ABSTRACT

A security agent for a host computing device may be implemented with multiple levels of indirection from an operating system (OS) kernel of the computing device in order to facilitate software upgrades for the security agent. An unserviceable kernel-mode component of the security agent may directly interface with the OS kernel and hook into a function (e.g., a security callback function) of the OS kernel in a first level of indirection, while a serviceable kernel-mode component of the security agent, which is upgradable, may indirectly interface with the OS kernel via the unserviceable kernel-mode component in a second level of indirection. The serviceable kernel-mode component may be configured to process events, and/or data related thereto, received from the OS kernel via the unserviceable kernel-mode component in order to monitor activity on the computing device for malware attacks.

20 Claims, 5 Drawing Sheets

(56) References Cited

U.S. PATENT DOCUMENTS

| | | | |
|---|---|---|---|
| 2012/0204193 A1* | 8/2012 | Nethercutt | G06F 11/3495 |
| | | | 719/330 |
| 2012/0255021 A1 | 10/2012 | Sallam | |
| 2013/0333040 A1* | 12/2013 | Diehl | G06F 9/46 |
| | | | 726/24 |
| 2015/0268947 A1* | 9/2015 | Ionescu | G06F 21/566 |
| | | | 717/172 |
| 2018/0336229 A1* | 11/2018 | Muehle | G06F 16/22 |

\* cited by examiner

USING INDIRECTION TO FACILITATE SOFTWARE UPGRADES

BACKGROUND

With Internet use forming an ever greater part of day to day life, malicious software—often called "malware"—that steals or destroys system resources, data, and private information is an increasing problem. Governments and businesses devote significant resources to preventing intrusions by malware. Malware comes in many forms, such as computer viruses, worms, trojan horses, spyware, keystroke loggers, adware, and rootkits. Some of the threats posed by malware are of such significance that they are described as cyber terrorism or industrial espionage.

Security software designed to counter such threats can be difficult to implement effectively on a host computing device, depending on the type of operating system (OS) environment. For instance, some types of OS's are not extensible, leaving few options for security software developers/vendors to develop security software that adequately interfaces with the OS kernel to provide desired security features. Often, the security software developer must modify the OS kernel itself in order to write code that allows the security software to "hook" into the OS kernel in a way that allows the security software to monitor desired activity on the host computing device. In this scenario, the OS kernel must be re-compiled before the security software can be utilized, which can be a complicated and inefficient process.

Furthermore, once the vendor's security software is installed on a host computing device, it is often "unserviceable." In other words, once the security software is installed and loaded on the host machine, the security software cannot be easily upgraded with different code in order to update security features. This is problematic if a security vendor wants to quickly deploy an upgrade to a security agent on a host computing device. Due to the way in which security software is required to interface with the OS kernel in some types of OS's, upgrading the security software at a suitable rate becomes impracticable, and is often heavily dependent on cooperation from the vendor of the OS. For example, the security vendor may have to wait until the next upgrade to the OS kernel itself in order to deploy an upgrade for its own security software. This inability to easily change/upgrade security software on some types of OS's leaves host computing devices vulnerable to attackers. This inflexibility is undesirable in today's fast-paced cybersecurity environment. A valuable weapon against malware attacks is the ability to be dynamic and flexible in terms of updating security methodologies at a rate that will outpace the rate of change in malware attack strategies.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
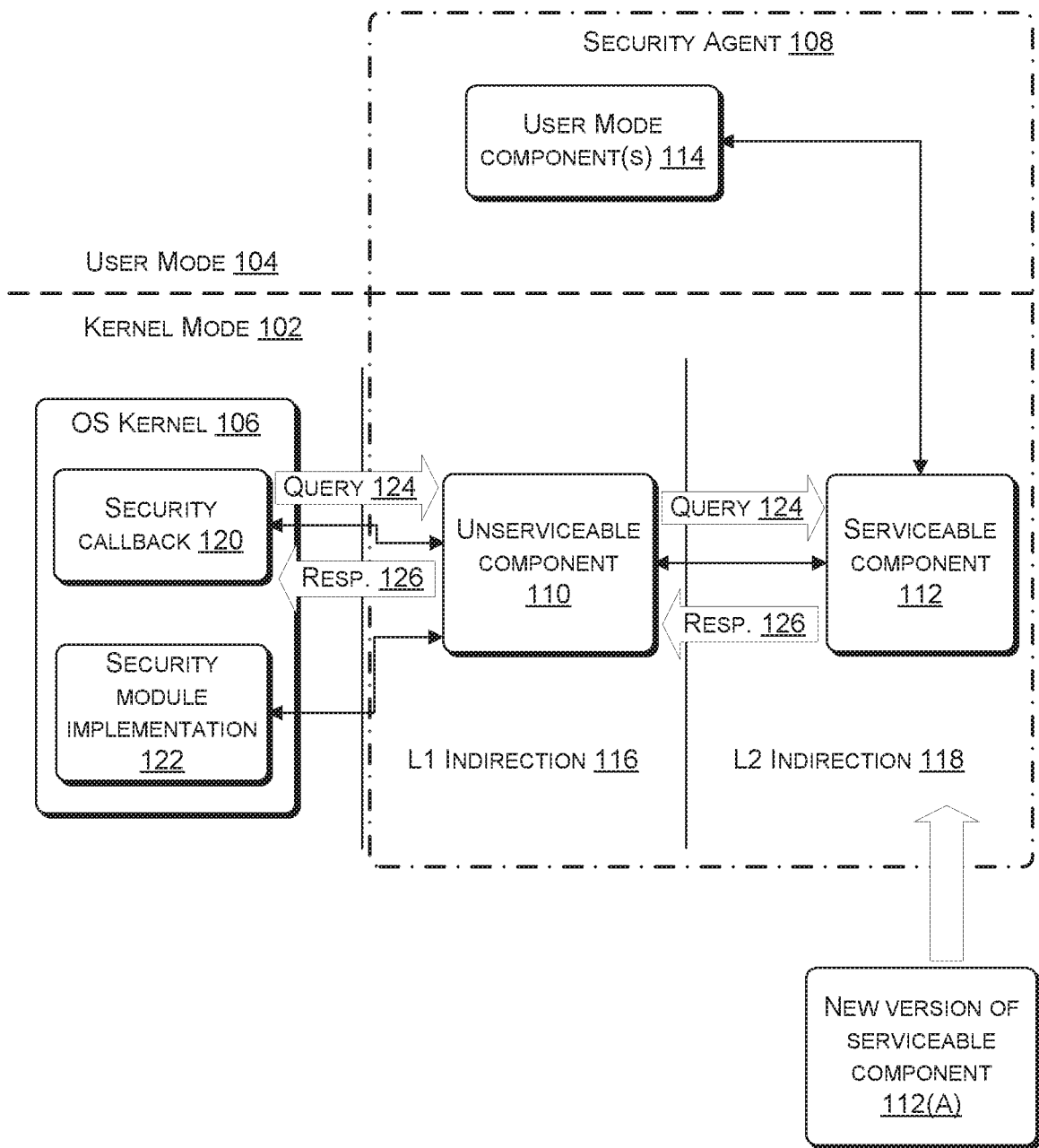
FIG. 1 is a diagram illustrating multiple executable components in memory of an example host computing device, the multiple executable components including, inter alia, an unserviceable kernel-mode component of a security agent that directly interfaces with an OS kernel in a first level of indirection, and a serviceable kernel-mode component that indirectly interfaces with the OS kernel in a second level of indirection.

This disclosure describes, in part, a security agent for a host computing device that provides multiple levels of indirection from an operating system (OS) kernel of the computing device in order to facilitate software upgrades for the security agent. The security agent may comprise an unserviceable kernel-mode component and a serviceable kernel-mode component. The unserviceable kernel-mode component may directly interface with the OS kernel of the computing device and hook into a function (e.g., a security callback function) of the OS kernel in a first level of indirection, while the serviceable kernel-mode component may indirectly interface with the OS kernel via the unserviceable kernel-mode component in a second level of indirection. The serviceable kernel-mode component may be configured to process events, and/or data related thereto, received from the OS kernel via the unserviceable kernel-mode component in order to monitor activity on the computing device for malware attacks.

The multi-tiered indirection that is provided by the disclosed security agent allows flexibility for a security software developer/vendor to upgrade the security agent software on-demand by upgrading the code of the serviceable kernel-mode component, while leaving the unserviceable kernel-mode component unchanged. This allows for upgrading the security agent independently from any modification and recompiling of the OS kernel, making for efficient and flexible software upgrades of the security agent. This, in turn, allows a security software developer/vendor to upgrade the security agent with security features aimed at countering malware attacks, and to do so at a rate that outpaces the rate of change in malware attack strategies of would-be attackers.

Once implemented, the security agent may be configured to operate on the host computing device to monitor activity on the computing device for malware attacks. For example, the unserviceable kernel-mode component may receive queries from the hooked function (e.g., the security callback function) in the OS kernel, and may forward the queries to the serviceable kernel-mode component, which may subsequently return a response to a received query indicating whether the execution of a process on the computing device is permitted to continue.

In some embodiments, usage of the serviceable kernel-mode component can be monitored using a primitive(s) in order to keep track of whether, and the extent to which, the serviceable kernel-mode component is utilized on a host computing device. This monitored usage may be used for determining whether and when to unload one or more kernel-mode components of the security agent, such as the serviceable kernel-mode component and/or the unserviceable kernel-mode component. Unloading one or more of these kernel-mode components of the security agent when the serviceable kernel-mode component is not in use allows for computing resource conservation on the host computing device. In some embodiments, the unserviceable kernel-mode component may be provided/installed as a "low cost" component (e.g., requiring little memory and little processing resources to store and execute). Nevertheless, the ability to unload (or "deactivate" or "turn off") the unserviceable kernel-mode component when the serviceable kernel-mode component is not being utilized is a further enhancement that can reduce resource consumption (e.g., memory, processing, or other resources) on the computing device to improve the overall compute capacity and efficiency of the computing device.

Although software upgrades are often described herein, by way of example, as upgrades for security agent software, it is to be appreciated that the techniques and systems may be applicable to other types of software (and/or firmware), such as non-security software and/or firmware. "Software" as used herein may include software, firmware, or a combination thereof. Furthermore, although OS kernel versions are often described herein with respect to a Linux OS, it is to be appreciated that the techniques and systems described herein may be applicable to an OS with similar characteristics to a Linux OS, or even other OS types, including Mac™ OS's, Windows™ OS's, and the like.

FIG. 1 is a diagram illustrating multiple executable components in memory of an example host computing device according to various embodiments. As illustrated, one or more components may run in kernel mode 102 of a computing device, while one or more other components may run in user mode 104 of the computing device. The components that are described as running in the kernel mode 102 are referred to herein as "kernel-mode components," while the components that are described as running in the user mode 104 are referred to herein as "user-mode components." The kernel mode 102 and user mode 104 of a computing device correspond to protection domains—also known as rings—that protect data and functionality of the computing device from faults and malware. Typically, the user mode 104 is associated with the outermost ring and the least level of privileges to access memory and functionality, while the kernel mode 102 is associated with an inner ring (sometimes the innermost ring, although in modern computing devices there is sometimes an additional level of privilege) and a higher level of privileges, as compared to the user mode 104, to access memory and functionality, including operating system processes.

FIG. 1 shows an operating system (OS) kernel 106 that runs in the kernel mode 102 of the computing device. The OS kernel 106 may be a kernel of any type of OS. The examples described herein often refer to the OS kernel 106 as being a Linux kernel, but this is not limiting on the disclosure. Linux is a member of the family of UNIX OS's, and may be run on a variety of computer platforms, including personal computers with an x86 processor. Linux is a free, open-ended implementation of UNIX, and source code for a Linux kernel is available to the public. In any case, the OS kernel 106 may have load and unload functions for loading and unloading components, such as processes that execute on the computing device.

An example architecture of a security agent 108 is also shown in FIG. 1. The security agent 108 may include one or more kernel mode components, including, without limitation, an unserviceable kernel-mode component 110 (sometimes shortened to "unserviceable component 110") and a serviceable kernel-mode component 112 (sometimes shortened to "serviceable component 112"). The security agent 108 may also include one or more user mode components 114. These components (110, 112, 114), among others, of the security agent 108 may operate together to observe events, and/or data relating thereto, pertaining to activity (e.g., opening files, opening network connections, etc.) on the computing device, and to determine actions to take based on those events and/or data. Such actions taken by the security agent 108 may be to halt the execution of one or more processes that may be determined to be associated with malicious code. For example, the security agent 108 may instruct the OS kernel 106 to cease execution of a process that the security agent 108 has detected to be associated with malware. In some embodiments, the security agent 108 interacts with a remote security system as part of a Cloud-based detection loop, and the resources of the remote security system can be leveraged accordingly to further process events and/or data in the Cloud and determine actions to take with respect to the computing device. More detail regarding the remote security system is provided below, particularly with reference to FIG. 2.

Upon installation of the security agent 108 on a computing device, the unserviceable kernel mode component 110 may interface directly with the OS kernel 106 in a first level of indirection 116, and the serviceable kernel-mode component 112 may interface indirectly with the OS kernel 106, via the unserviceable kernel-mode component 110, in a second level of indirection 118. This provides multiple levels of indirection from the OS kernel 106 within the kernel-mode 102. This multi-tiered indirection from the OS kernel 106 provides adequate separation between the serviceable kernel-mode component 112 and the OS kernel 106 so that a vendor of the security agent 108 can service (e.g., upgrade with a new version of the serviceable component 112(A)) the serviceable component 112 of the security agent 108 without dependence on any development activity associated with the OS kernel 106. For example, a developer/vendor of the security agent 108 does not have to participate in the build for the OS kernel 106 to implement security features provided by the security agent 108. Instead, the developer/vendor of the security agent 108 can efficiently and flexibly upgrade the security agent 108, at will, by upgrading the serviceable kernel-mode component 112. This added flexibility—provided by the indirection within the kernel mode 102 described herein—allows a developer/vendor of the security agent 108 to dynamically modify security features and functionality of the security agent 108 in order to stay ahead of potential attack strategies and methodologies employed by would-be attackers.

The unserviceable component 110 is, as its name implies, unserviceable in that the code of the unserviceable component 110 cannot be easily changed/modified without a more complex procedure to modify the code, which may involve recompiling the OS kernel 106 itself. In this sense, the unserviceable component 110 can be considered a "pinned" component, in that it is uneasily changed.

Meanwhile, the serviceable component 112 is, as its name implies, serviceable in that the serviceable component 112 can be easily changed/modified via an upgrade or a similar change in the code for the serviceable component 112, as compared to the unserviceable component 110. The serviceable component 112 can be considered an "unpinned" component due to its ability to be easily changed/modified, such as without requiring the OS kernel 106 to be recompiled. In fact, the serviceable component 112 may be configured to be upgraded on-the-fly, without requiring a reboot of the computing device on which the upgrade is installed.

As further illustrated in FIG. 1, the OS kernel 106 may include (or otherwise be associated with) one or more functions, such as a security callback function 120. The security callback function 120 shown in FIG. 1 is merely one example type of function in the OS kernel 106 that can be hooked by the unserviceable kernel-mode component 110, and there may be many other types of functions besides, or in addition to, the security callback function 120 that can be hooked in a similar manner to that shown in FIG. 1. The security callback function 120 may be invoked in response to particular activity on the associated computing device, such as a function invocation in response to opening a file, opening a network connection, executing an application, or any similar computing-related activity. This activity that triggers the function invocation can be user initiated or system initiated.

In the absence of the security agent 108, the security callback function 120 of the OS kernel 106 normally points to a particular security module implementation 122 in the OS kernel 106. The security module implementations, such as the implementation 122, can be changed at boot time of the OS kernel 106. An example of the security module implementation 122 is Security Enhanced (SE) Linux. SE Linux is a kernel-mode security module implementation 122 that provides a mechanism for supporting access control security policies.

Furthermore, in the absence of the security agent 108, when the security callback function 120 is invoked, such as in response to opening a file, the security callback function 120 normally queries the security module implementation 122 to ask permission to open the file, and the security module implementation 122 is thereafter configured to return a response to the query, the response indicating whether the process (e.g., opening and executing the file) is permitted to continue. In isolation (i.e., in the absence of the security agent 108 disclosed herein), this security mechanism of the OS kernel 106 is a "fixed" security solution, making it relatively easy for attackers to determine how the security functionality operates within the OS kernel 106 and to determine how to defeat the fixed security mechanism. In other words, the inability to easily change this fixed security mechanism allows time for attackers to develop attack strategies that circumvent the OS kernel's 106 security features. Accordingly, the security agent 108, and particularly the ability to dynamically upgrade the serviceable kernel-mode component 112 of the security agent 108, makes it more difficult for a would-be attacker to determine how to defeat/circumvent the security features of the security agent 108, seeing as how they can be changed at a rate that outpaces a rate of change in attack methodologies.

In order to implement the security agent 108 so that it can observe events (e.g., events pertaining to, without limitation, the opening of a file, the opening of a network connection, the execution of an application, etc.) and/or data relating thereto, the unserviceable kernel-mode component 110 may be configured to hook the security callback function 120 of the OS kernel 106 so that the security callback function 120 points to the unserviceable kernel-mode component 110 in a first level of indirection 116 (i.e., instead of pointing to the security module implementation 122). "Hooking" may be accomplished by replacing code in the OS kernel 106—code that normally points from the security callback function 120 to the security module implementation 122—with different code that, when executed, causes the security callback function 120 to point to the unserviceable kernel-mode component 110. For example, code in the OS kernel 106 associated with the security callback function 120 can be modified into modified code. When this modified code is subsequently executed, a processor executing the code may "jump" to an allocated portion of memory with instructions that redirect the processor to the code of the unserviceable kernel-mode component 110, or to code that, when executed, requests loading of, or access to, the unserviceable kernel-mode component 110. In this manner, the security callback function 120, when invoked, may send queries, such as the query 124 shown in FIG. 1, to the unserviceable kernel-mode component 110, and the unserviceable kernel-mode component 110 may forward the queries (e.g., query 124) to the serviceable kernel-mode component 112. This gives the security agent 108 the ability to observe events and/or data relating thereto on the computing device. Other types of functions can be hooked in a similar manner to give the security agent 108 the ability to observe any type of desired event/data pertaining to activity on the computing device.

In response to receiving a query 124, the serviceable kernel-mode component 112 may be configured to generate, and return, a response 126 to the query 124 indicating whether execution of a process is permitted to continue. In some embodiments, the serviceable kernel-mode component 112 may determine the nature of the query 124 (e.g., a type of callback), retrieve relevant parameters relating to this determination, and send data relating to the query 124 to a user-mode component(s) 114 executing in the user mode 104. The user-mode component(s) 114 may be configured to analyze the events and/or data it receives from the serviceable kernel-mode component 112, and/or send the events and/or data to a remote security system for further processing. Based upon an analysis of the events and/or data relating to the query 124, the security agent 108 (perhaps in conjunction with the remote security system) may determine that the analyzed events and/or data are associated with malicious code. In this instance, the serviceable kernel-mode component 112 may receive information regarding this determination, and may generate the response 126, that is ultimately provided to the OS kernel 106, indicating that continued execution of the process relating to the query 124 is to be halted. For example, the security callback query 124 may pertain to a request to open a particular file on the computing device, and the security agent 108 (perhaps in conjunction with a remote security system) may determine that this request to open the particular file is associated with malicious code, and may inform the OS kernel 106, via the response 126, to halt further execution of the process for opening the particular file.

In some embodiments, the unserviceable component 110 is "cheap" to implement in terms of an amount of memory and/or processing resources consumed. For example, the unserviceable kernel-mode component 110 may consume very little memory to store and may consume very little processing resources to execute. For example, the unserviceable component 110 may be a relatively small piece of code, as compared to a much larger piece of code for the serviceable component 112 of the security agent 108. Said another way, a significant portion (e.g., a majority) of the security functionality of the security agent 108 may be provided by the code of the serviceable kernel-mode component 112, while the unserviceable kernel-mode component 110 may act primarily as a "pass-through" mechanism to provide separation between the OS kernel 106 and the serviceable kernel-mode component 112. In this manner, the unserviceable kernel-mode component 110 may function primarily as a conduit to forward events and data (e.g., the query 124) it receives from the OS kernel 106 to the serviceable kernel-mode component 112, and to forward responses 124 it receives from the serviceable kernel-mode component 112 to the OS kernel 106. Not only does this limit the exposure/visibility of the security mechanisms and techniques of the security agent 108 to the OS kernel 106, but it also allows the direct interface between the OS kernel 106 and the security agent 108 to persist while the serviceable kernel-mode component 112 can be changed at will and on the fly, without requiring a reboot and/or recompiling of the OS kernel 106. The flexibility to change the serviceable kernel-mode component 112 in this manner makes it impracticable for a would-be attacker to design an effective attack strategy against the security agent 108 because the serviceable kernel-mode component 112 can be continually changed/upgraded to implement new security features at a rate that is difficult for the would-be attacker to strategize against. The would-be attacker may attempt to circumvent fixed security mechanisms provided by the OS kernel 106 itself and/or the unserviceable component 110 of the security agent 108. However, those efforts are rendered futile due to the ability to upgrade the security agent 108 via the serviceable kernel-mode component 112.

In some embodiments, the serviceable kernel-mode component 112 comprises a driver for the security agent 108, and may be provided in the form of a binary program (or simply "binary"). Accordingly, binary programs for the serviceable kernel-mode component 112 that include a driver corresponding to an upgrade to the security agent 108 software may be received by the computing device for upgrading the security agent 108. An individual binary program for the serviceable kernel-mode component 112 may correspond to a specific OS kernel version. Thus, the driver of a particular binary program for the serviceable kernel-mode component 112 may be configured to execute on host computing devices that run a particular OS kernel version. In some embodiments, such a binary program may include drivers and headers built from the original source code for a particular upgrade to the security agent 108.

As shown by the double arrows in FIG. 1, the serviceable kernel-mode component 112 and/or the unserviceable kernel-mode component 110 may be further configured to interact with the security module implementation 122 (e.g., SE Linux) of the OS kernel 106 as part of generating a response 126 to a query 124. This interaction with the security module implementation 122 can occur at any point after the query 124 is received at the unserviceable component 110. For example, the unserviceable component 110 may directly, and/or the serviceable component 112 may indirectly, consult the security module implementation 122 for access to security policies of the OS kernel 106 itself. These security policies may be factored into the analysis performed by the security agent 108 in deciding whether to allow execution of a process associated with the received query 124 to continue. In this manner, the security module implementation 122, and its security policies, may still play a role in the security-related determination that is ultimately made by the security agent 108, even though the security callback function 120 points, via indirection, to the security agent 108.

To provide an analogy for further illustration of the techniques and systems described herein, imagine that the OS kernel 106 in FIG. 1 represents a physical environment (e.g., an area of a building) to be monitored, and the serviceable component 112 represents a security camera that records the physical environment as part of a security service to monitor activity occurring within the physical environment. The unserviceable component 110 in this fictitious analogy may represent a component, such as a socket or a plug, which allows the security camera to interface with the physical environment for such monitoring. If the security camera is rendered defective (i.e., needs fixing), and/or if a new type of security camera is to be implemented in the system to monitor particular types of activity and/or areas of the physical environment that the original security camera can no longer monitor, the security camera can be fixed or replaced with a fixed/new security camera, and this fixed/new security camera can be "plugged into" the socket/plug so that the physical environment can be monitored by the fixed/new security camera. This analogy is primarily provided to illustrate how the unserviceable kernel-mode component 110 is more or less fixed or pinned in the system, and is also a cheap component to implement, whereas the serviceable kernel-mode component 112 implements much of the security features and functionality for monitoring activity on a computing device, and is also removable/modifiable in order to upgrade the security agent 108 on-demand, as needed or desired.

Figure 2:
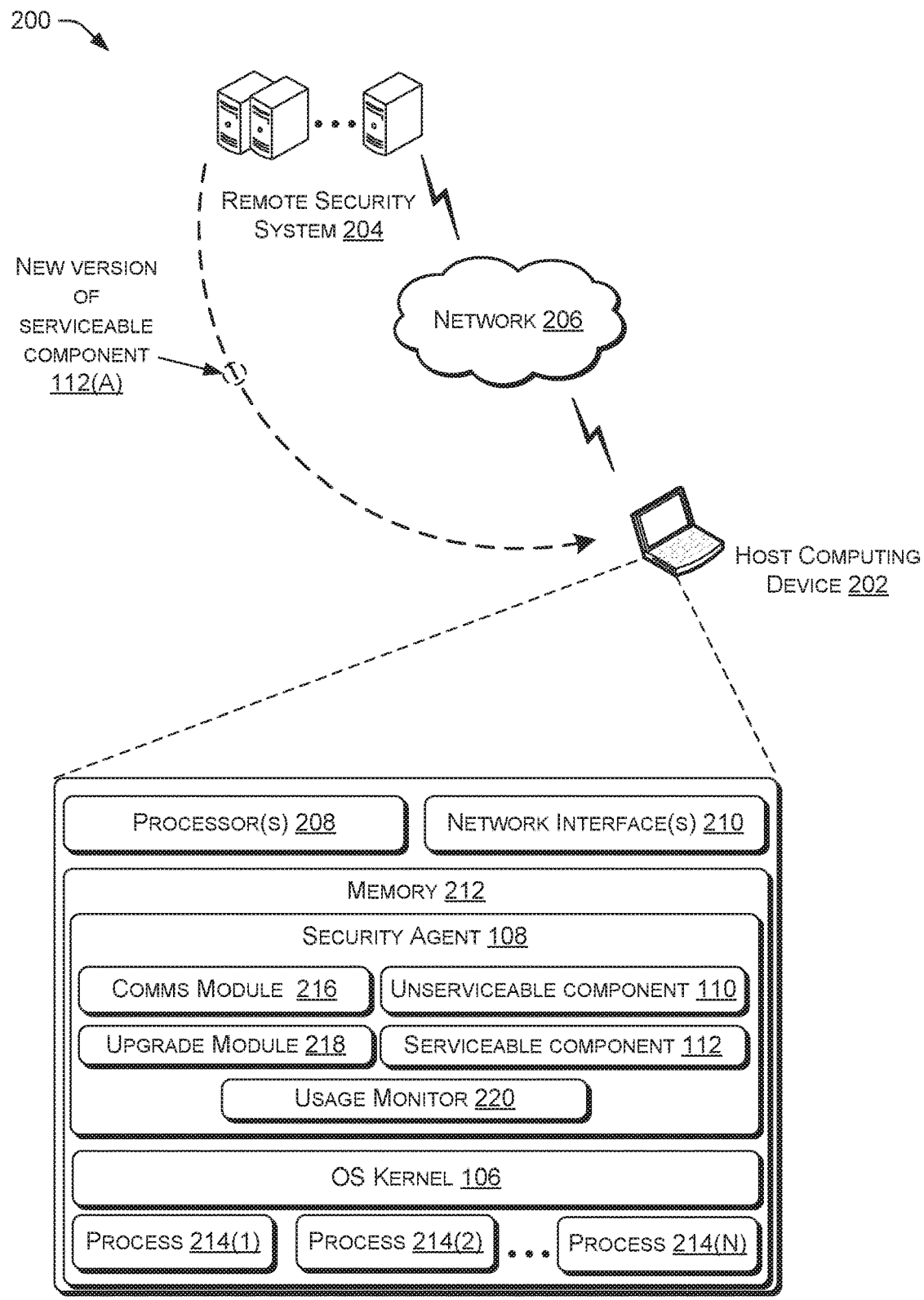
FIG. 2 illustrates an example environment showing an example computing device having an installed security agent with multiple levels of indirection from an OS kernel of the computing device, the multi-tiered indirection facilitating software upgrades to a serviceable kernel-mode component of the security agent.

FIG. 2 illustrates an example environment 200 showing an example computing device 202 (sometimes referred to as a "host machine" 202) having an installed security agent 108. As described with reference to FIG. 1, and elsewhere in this disclosure, the security agent 108 provides multiple levels of indirection with respect to an OS kernel 106 of the computing device 202. This multi-tiered indirection facilitates software upgrades to a serviceable kernel-mode component 112 of the security agent 108. For example, FIG. 2 shows how a new version of the serviceable kernel-mode component 112(A) can be received from a remote security system 204 over a network 206, and subsequently installed on the computing device 202.

The remote security system 204 may be implemented as a cloud of security service devices, and is sometimes referred to herein as a "remote security service" 204 or a "security service cloud" 204. In some embodiments, the network(s) 206 may include any one or more networks, such as wired networks, wireless networks, and combinations of wired and wireless networks. Further, the network(s) 206 may include any one or combination of multiple different types of public or private networks (e.g., cable networks, the Internet, wireless networks, etc.). In some instances, the computing device 202 and the remote security system 204 communicate over the network 206 using a secure protocol (e.g., https) and/or any other protocol or set of protocols, such as the transmission control protocol/Internet protocol (TCP/IP).

It is to be appreciated that the remote security system 204 may be configured to provide a security service to a large number of host computing devices 202. FIG. 2 shows one host computing device 202 merely for illustrative purposes, when in fact, the environment 200 can include many more host computing devices 202 configured to interact with the remote security system 204 in a similar manner to that described with reference to the computing device 202.

In various embodiments, the computing device 202 and devices of the remote security system 204 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the computing device(s) of the remote security system 204 represent a plurality of computing devices working in communication, such as a cloud computing network of nodes. When implemented on multiple computing devices, the remote security system 204 may distribute its modules and data among the multiple computing devices of the remote security system 204. In some implementations, one or more of the computing device 202 and/or a computing device(s) of the remote security system 204 represents one or more virtual machines implemented on one or more computing devices.

As shown in FIG. 2, the computing device 202 may include a processor(s) 208 and a network interface(s) 210. The processor(s) 208 may be or include any sort of processing unit, such as a central processing unit (CPU) or a graphic processing unit (GPU). The network interface(s) 210 allows the associated computing device 202 to communicate with other computing devices in the environment 200 over the network(s) 206, such as the remote security system 204. The network interface(s) 210 may send and receive communications and/or data through one or both of the network 206 or other networks. The network interface(s) 210 may also support both wired and wireless connection to various networks.

The computing device 202 may include memory 212 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other non-transitory computer-readable medium which can be used to store the desired information and which can be accessed by the computing device 202.

The memory 212 may store, among other things, the security agent 108, the OS kernel 106, and one or more processes 214(1)-(N) currently executing on the computing device 202. As mentioned, the security agent 108 may comprise a security software program that executes on the computing device 202. During execution, the security agent 108 observes events and/or data relating thereto, determines actions to take based on those events/data, and/or sends the events/data to the remote security system 204 for further processing and analysis. In some embodiments, the security agent 108 operates as a virtual machine/shadow operating system, and may execute at least partially in the kernel mode 102 of the computing device 202. In some embodiments, the security agent 108 may load before the OS kernel 106 of the computing device 202, such as by loading very early in the boot-time of the computing device 202 (e.g., the security agent 108 may load within the first few dozen instructions upon booting the computing device 202). By loading early in boot-time, the security agent 108 can significantly reduce the window in which malware can become active and interfere with operation of the computing device 202 or run unobserved on the computing device 202.

The security agent 108 may include a communications (comms) module 216 to communicate with the remote security system 204. An example of communicating with the remote security system 204 is to send events, and/or data relating thereto, to the remote security system 204. Another example of communicating with the remote security system 204 is to receive software upgrades for the security agent 108. The security agent 108 may further include an upgrade module 218 to manage the installation of received software upgrades to the security agent 108, as well as the unserviceable kernel-mode component 110 and the serviceable kernel-mode component 112 introduced in FIG. 1. The security agent 108 may further include a usage monitor 220 to monitor usage of the serviceable kernel-mode component 112.

When the security agent 108 is to be upgraded to a new version, a new version of the serviceable component 112(A) may be received over the network 206 from the remote security system 204 via the communications module 216, and the upgrade module 218 may manage the installation and loading of the new version of the serviceable kernel-mode component 112(A). The new version of the serviceable kernel-mode component 112(A) can comprise a binary program that includes a driver for the security agent 108.

It is to be appreciated that, in some instances, the computing device 202 may have features or functionality in addition to those that FIGS. 1 and 2 illustrate. For example, the computing device 202 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within any or all of the computing device 202 may reside remotely from that/those device(s), in some implementations, such as in the remote security system 204.

The processes described herein are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
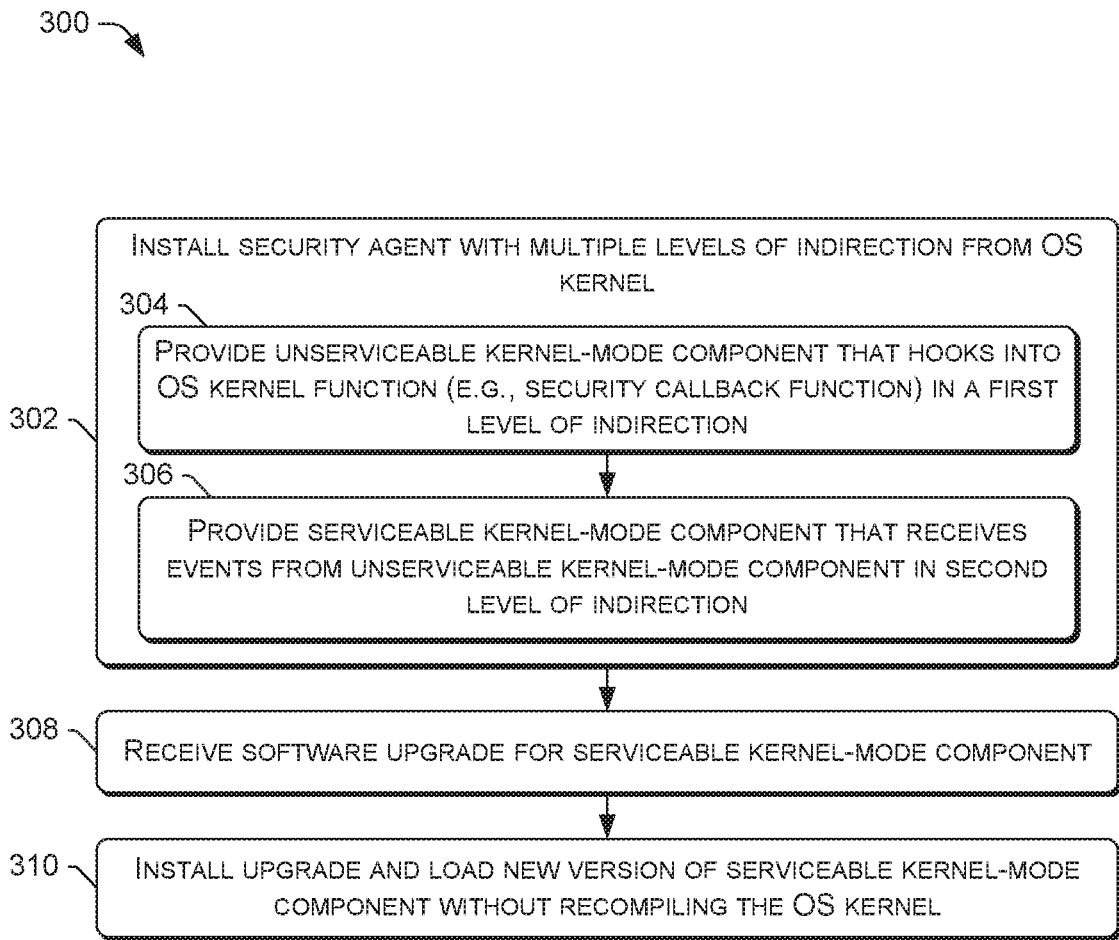
FIG. 3 illustrates an example process for upgrading a serviceable kernel-mode component of a security agent on a computing device.

FIG. 3 illustrates an example process 300 for upgrading a serviceable kernel-mode component 112 of a security agent 108 on a computing device 202. By way of example, and not limitation, the process 300 is described with reference to the previous figures, and in particular with reference to the upgrade module 218 and the serviceable kernel-mode component 112 of the security agent 108.

At 302, the upgrade module 218, or another module of the security agent 108, may receive and install a security agent 108 that provides multiple levels of indirection from the OS kernel 106 of the computing device 202. An example of this multi-tiered indirection is shown in FIG. 1 where the security agent 108 comprises an unserviceable kernel-mode component 110 and a serviceable kernel-mode component 112 that provides indirection from the OS kernel 106.

At 304, the installation of the security agent 108 may include providing/installing an unserviceable kernel-mode component 110 that directly interfaces with the OS kernel 106 of the computing device 202 and that hooks into a function (e.g., a security callback function 120) of the OS kernel 106 in a first level of indirection 116.

At 306, the installation of the security agent 108 may further include providing/installing a serviceable kernel-mode component 112 that indirectly interfaces with the OS kernel 106, via the unserviceable kernel-mode component 110, in a second level of indirection 118. The serviceable kernel-mode component 112 may be configured to receive events and/or data relating thereto from the OS kernel 106 via the unserviceable kernel-mode component 110. In some embodiments, the serviceable kernel-mode component 112 comprises a driver for the security agent 108. Although two levels of indirection are shown in FIG. 1, and described with reference to blocks 304 and 306, it is to be appreciated that there may be additional levels of indirection provided by the security agent 108, such as three or more levels of indirection from the OS kernel 106.

At 308, the upgrade module 218 may receive a software upgrade (e.g., a new version of the serviceable kernel-mode component 112(A)) to upgrade the serviceable kernel-mode component 112 currently installed as part of the security agent 108 on the computing device 202. In some embodiments, the new version of the serviceable kernel-mode component 112(A) comprises a binary program, including a driver, for the security agent 108.

At 310, the upgrade module 218 may install the software upgrade to load a new version of the serviceable kernel-mode component 112(A). In some embodiments, the installation of the software upgrade to load the new version of the serviceable kernel-mode component 112(A) is performed without recompiling the OS kernel 106. This may allow a security software developer/vendor to flexibly and efficiently upgrade its security agent 108 software on host computing devices, such as the host computing device 202, without dependence on development cycles of the OS kernel 106 itself, and without participating in the build or development of the OS kernel 106. This independence allows for upgrading the security agent 108 at a suitable rate to outpace a rate of change in attack strategies employed by would-be attackers.

Figure 4:
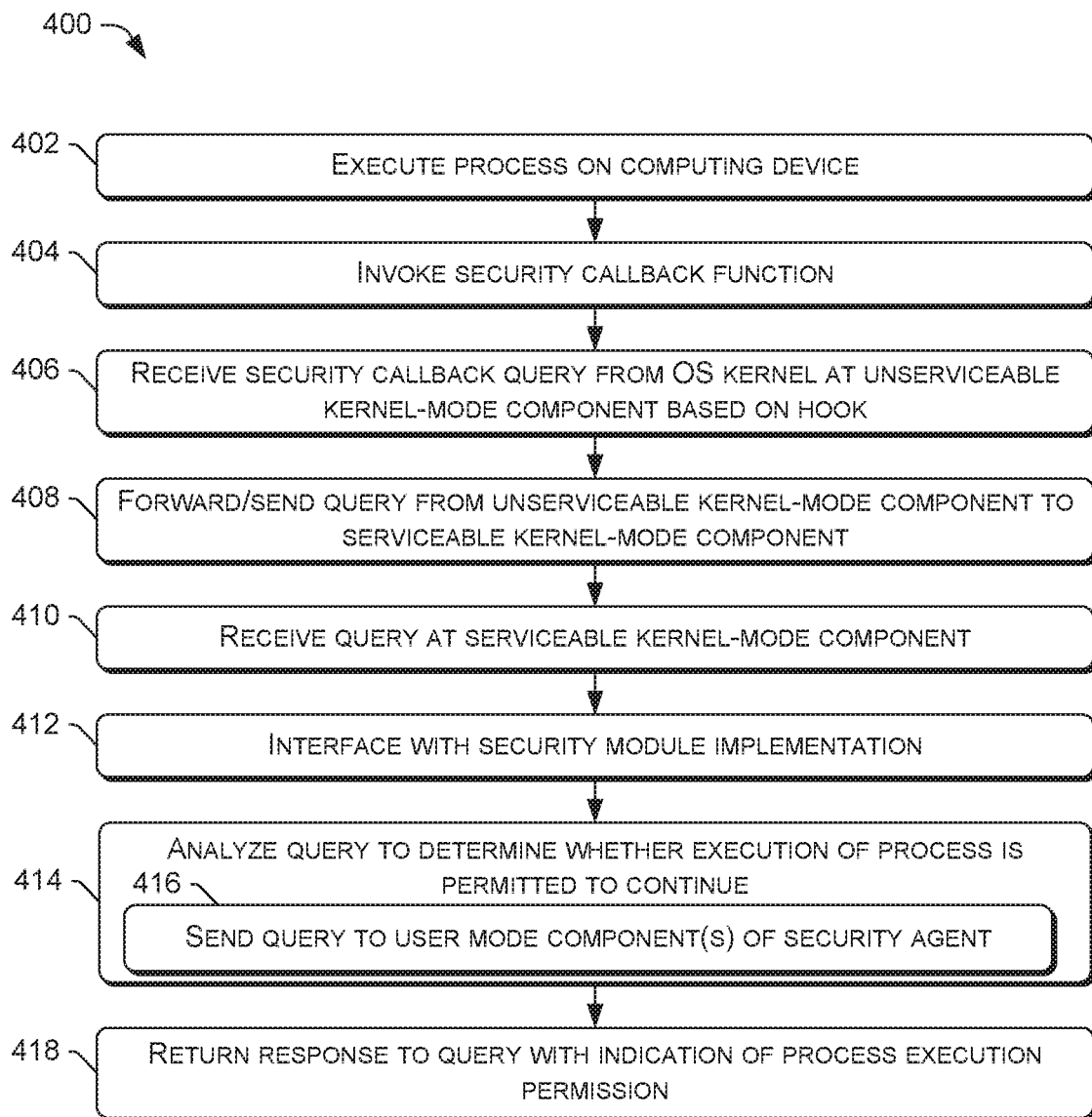
FIG. 4 illustrates an example process for monitoring activity on a computing device using a security agent with multiple levels of indirection from the OS kernel of the computing device.

FIG. 4 illustrates an example process 400 for monitoring activity on a computing device 202 using a security agent 108 with multiple levels of indirection from the OS kernel 106 of the computing device 202. By way of example, and not limitation, the process 400 is described with reference to the previous figures.

At 402, a process 214 may be executed on the computing device 202. Before the process 214 is executed, the OS kernel 106 may receive a load request for the process 214 as a result of particular activity occurring on the computing device 202. Such an activity may be, for example, a request to open a file, a request to open a network connection, a request to execute an application, or any similar type of activity for which a process 214 is typically invoked and executed.

At 404, in response to execution of the process 214 at block 402, the OS kernel 106 of the computing device 202 may invoke a function, such as a security callback function 120. In the absence of the security agent 108, this invocation of the security callback function 120 normally causes a query to be sent to a security module implementation 122 (e.g., SE Linux) of the OS kernel 106.

At 406, however, due to the unserviceable kernel-mode component's 110 hook into the security callback function 120 (See e.g., block 304 of the process 300), a security callback query 124 that is generated by the security callback function 120 may be received at the unserviceable kernel-mode component 110 of the security agent 108 in a first level of indirection 116 from the OS kernel 106. In some embodiments, the unserviceable kernel-mode component 110 may be in an unloaded state until it receives the query 124, in which case, the unserviceable kernel-mode component 110 loads in order to receive and forward the query 124.

At 408, the unserviceable kernel-mode component 110 may forward (or send) the security callback query 124 that was received from the OS kernel 106 to the serviceable kernel-mode component 112 of the security agent 108 in a second level of indirection 118.

At 410, the serviceable kernel-mode component 112 may receive the security callback query 124 that was forwarded from the unserviceable kernel-mode component 110.

At 412, the serviceable kernel-mode component 112 may indirectly interface with the security module implementation 122 (e.g., SE Linux) of the OS kernel 106 via the unserviceable kernel-mode component 110. It is to be appreciated that block 412 can be performed at any point in the process 400 (i.e., not necessarily in the sequence shown in FIG. 4), and also that block 412 can be performed by another component besides the serviceable kernel-mode component 112. For example, the unserviceable component 110 may be configured to directly interface with the security module implementation 122 in response to receiving the query 124 from the OS kernel 106 and prior to forwarding the query 124 to the serviceable kernel-mode component 112. In this alternative embodiment, the unserviceable component 110 may forward information to the serviceable component 112 (along with the query 124) that it obtained from the security module implementation 122.

At 414, the serviceable kernel-mode component 112 may analyze the query 124 to determine whether execution of the process 214 is permitted to continue. In some embodiments, the analysis at block 414 may include determining the nature of the query 124 (e.g., the type of callback), and retrieving relevant parameters relating to this determination (e.g., parameters pertaining to the particular type of callback).

At 416, the serviceable kernel-mode component 112 may send data relating to the query 124 to a user-mode component(s) 114 of the security agent 108 that is executing in the user mode 104.

At 418, the serviceable kernel-mode component 112 may return a response 126 to the security callback query 124 indicating whether the execution of the process 214 is permitted to continue. Accordingly, if the analysis at 414 indicates that the query 124 is associated with malicious code, the process 214 may be halted to mitigate damage to the computing device 202. The process 400 may be carried out iteratively for multiple events (e.g., process creation events) that occur on the computing device 202 in order for the security agent 108 to monitor activity on the computing device 202 for security purposes. The security callback query 124 may correspond to an event, such as a process creation event.

Figure 5:
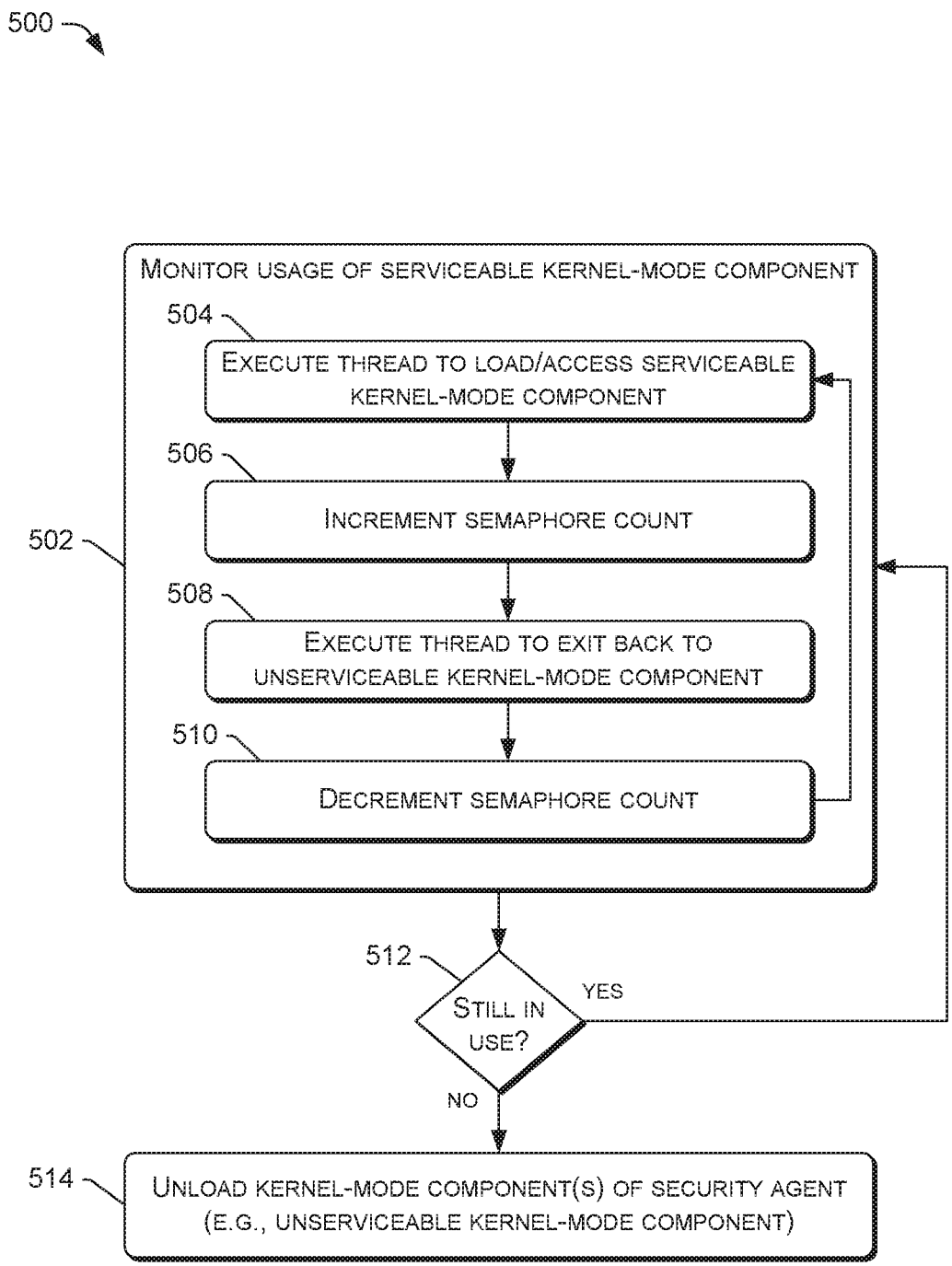
FIG. 5 illustrates an example process for monitoring usage of a serviceable kernel-mode component of a security agent on a computing device.

FIG. 5 illustrates an example process 500 for monitoring usage of a serviceable kernel-mode component 112 of a security agent 108 on a computing device 202. By way of example, and not limitation, the process 500 is described with reference to the previous figures, and in particular with reference to the usage monitor 220. The process 500 may, in some embodiments, start after a security agent 108, as described herein, has been installed on a computing device 202 and is currently executing in order to monitor activity on the computing device 202.

At 502, the usage monitor 220 may monitor usage of the serviceable kernel-mode component 112 using one or more primitives. An example primitive that can be used for this purpose is a semaphore. Primitives can be employed by the OS kernel 106 to avoid race conditions, which can occur when multiple threads access and manipulate the same object or data structure at the same time. A semaphore, for example, can be used to monitor usage of the serviceable kernel-mode component 112 by counting a number of uses of the serviceable kernel-mode component 112. It is to be appreciated that other types of primitives can be used in the process 500, such as, without limitation, a rundown reference, a spinlock, a waitlock, a mutex, and so on.

At 504, a thread may be executed to carry out an instruction to load or otherwise access the serviceable kernel-mode component 112. This may occur, for example, in response to a query 124 being forwarded from the unserviceable kernel-mode component 110 to the serviceable kernel-mode component 112 in response to the execution of a process 214 on the computing device 202, as described herein.

At 506, in response to the serviceable kernel-mode component 112 being loaded/accessed, a count of a primitive (e.g., a semaphore) can be incremented (e.g., from count=0 to count=1). The incrementing of the primitive's count at block 506 indicates, to other threads, that the serviceable kernel-mode component 112 is currently in use.

At 508, a thread may be executed to carry out an instruction to exit the serviceable kernel-mode component 112 back to the unserviceable kernel-mode component 110. This may occur, for example, in response to the serviceable kernel-mode component 112 returning a response 126 to the query 124, as described herein.

At 510, in response to exiting the serviceable kernel-mode component 112 back to the unserviceable kernel-mode component 110, the count of the primitive (e.g., a semaphore) can be decremented (e.g., from count=1 to count=0). A count=0 indicates, to other threads, that the serviceable kernel-mode component 112 is not currently in use.

As shown by the arrow from block 510 back to block 504, blocks 504-510 may iterate for multiple processes 214 executing on the computing device 202, which may execute in parallel, causing the count to increment to a number that indicates a number of concurrent threads that are accessing the serviceable kernel-mode component 112 at any given moment. Thus, the count can increment to a number that is higher than two when multiple queries 124 are forwarded to the serviceable kernel-mode component 112.

At 512, the usage monitor 220 may determine whether the serviceable kernel-mode component 112 is still in use. The determination at block 512 may be based on the count of the primitive (e.g., the semaphore). For instance, if the count is any non-zero number, the determination at block 512 may be that the serviceable kernel-mode component 112 is still in use, and the process 500 may follow the "yes" route from block 512 back to block 502, where appropriate ones of the blocks 504-510 are performed until the count is ultimately decremented to zero, indicating that the serviceable kernel-mode component 112 is no longer in use. If and when the usage monitor 220 determines at block 512 that the serviceable kernel-mode component 112 is no longer in use, the process 500 may follow the "no" route from block 512 to block 514, where a kernel-mode component(s) of the security agent 108 may be unloaded. For example, the serviceable kernel-mode component 112 may be unloaded, which can conserve resources (e.g., by freeing allocated memory, freeing processing resources, etc.) on the computing device 202 for improving the processing performance of the computing device 202. In some embodiments, the unserviceable kernel-mode component 110 can be unloaded at block 514. The unserviceable kernel-mode component 110 may remain unloaded after block 514 unless and until another query 124 is sent to the unserviceable kernel-mode component 110 based on the hook into a function in the OS kernel 106.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
memory storing:
an operating system (OS) kernel configured to be operated by the one or more processors to invoke a security callback function in response to execution of a process on the system;
an unserviceable kernel-mode component of a security agent, wherein the unserviceable kernel-mode component is a pinned component and is configured to be operated by the one or more processors to:
hook the security callback function so that the security callback function points to the unserviceable kernel-mode component in a first level of indirection; and
forward a security callback query received from the OS kernel to a serviceable kernel-mode component of the security agent in a second level of indirection;
the serviceable kernel-mode component configured to be operated by the one or more processors to:
receive the security callback query forwarded from the unserviceable kernel-mode component; and
return a response to the security callback query indicating whether the execution of the process is permitted to continue; and
computer-executable instructions that, when executed by the one or more processors, cause the system to:
install a software upgrade to upgrade the serviceable kernel-mode component and to load a new version of the serviceable kernel-mode component;
determine that the new version of the serviceable kernel-mode component is no longer in use; and
in response to determining that the new version of the serviceable kernel-mode component is no longer in use, deactivate the unserviceable kernel-mode component.

2. The system of claim 1, wherein the unserviceable kernel-mode component interfaces directly with the OS kernel.

3. The system of claim 1, wherein installing the software upgrade is performed without recompiling the OS kernel.

4. The system of claim 1, wherein the computer-executable instruction, when executed by the one or more processors, further cause the system to monitor, using one or more primitives, usage of the new version of the serviceable kernel-mode component, and wherein determining that the new version of the serviceable kernel-mode component is no longer in use is based at least in part on the usage monitored by the one or more primitives.

5. The system of claim 1, wherein the computer-executable instruction, when executed by the one or more processors, further cause the system to:

in response to determining that the new version of the serviceable kernel-mode component is no longer in use, unload the new version of the serviceable kernel-mode component.

6. The system of claim 1, wherein the serviceable kernel-mode component is further configured to be operated by the one or more processors to:
    indirectly interface with a security module implementation of the OS kernel via the unserviceable kernel-mode component;
    access, from the security module implementation, security policies of the OS kernel; and
    factor the security policies into an analysis for determining whether the execution of the process is permitted to continue.

7. The system of claim 1, wherein the serviceable kernel-mode component comprises a driver for the security agent, the security agent configured to monitor activity on the system based at least in part on security callback queries received from the OS kernel via the unserviceable kernel-mode component.

8. A method comprising:
    installing a security agent on a computing device, the security agent comprising:
        an unserviceable kernel-mode component that directly interfaces with an operating system (OS) kernel of the computing device and hooks into a security callback function of the OS kernel so that the security callback function points to the unserviceable kernel-mode component in a first level of indirection, wherein the unserviceable kernel-mode component is a pinned component; and
        a serviceable kernel-mode component that indirectly interfaces with the OS kernel via the unserviceable kernel-mode component in a second level of indirection to receive events, or data related thereto, from the OS kernel via the unserviceable kernel-mode component and to process the events, or the data related thereto, to determine whether execution of a process on the computing device is permitted to continue;
    receiving, by the computing device, a software upgrade to upgrade the serviceable kernel-mode component;
    installing the software upgrade to load a new version of the serviceable kernel-mode component;
    determining that the new version of the serviceable kernel-mode component is no longer in use; and
    in response to the determining that the new version of the serviceable kernel-mode component is no longer in use, deactivating the unserviceable kernel-mode component.

9. The method of claim 8, wherein the receiving the software upgrade and the installing the software upgrade to load the new version of the serviceable kernel-mode component is performed without recompiling the OS kernel.

10. The method of claim 8, further comprising:
    invoking, by the OS kernel, the security callback function in response to the execution of the process on the computing device;
    receiving, based at least in part on the security callback function, a query at the unserviceable kernel-mode component from the OS kernel;
    obtaining, by at least one of the unserviceable kernel-mode component or the new version of the serviceable kernel-mode component, and from a security module implementation of the OS kernel, security policies of the OS kernel;
    receiving the query at the new version of the serviceable kernel-mode component from the unserviceable kernel-mode component; and
    returning, by the new version of the serviceable kernel-mode component, a response to the query indicating whether the execution of the process is permitted to continue, wherein the security policies are factored into an analysis for determining whether the execution of the process is permitted to continue.

11. The method of claim 10, wherein the query comprises a security callback query.

12. The method of claim 10, further comprising monitoring usage of the new version of the serviceable kernel-mode component using a primitive, wherein the determining that the new version of the serviceable kernel-mode component is no longer in use is based at least in part on the usage monitored using the primitive.

13. The method of claim 8, further comprising:
    in response to the determining that the new version of the serviceable kernel-mode component is no longer in use, unloading the new version of the serviceable kernel-mode component.

14. The method of claim 8, wherein the new version of the serviceable kernel-mode component comprises a driver for the security agent, the security agent configured to monitor activity on the computing device based at least in part on security callback queries received from the OS kernel via the unserviceable kernel-mode component.

15. One or more non-transitory computer-readable media storing computer-executable instructions that, when executed by one or more processors of a computing device, cause the computing device to perform actions comprising:
    installing a security agent on the computing device, the security agent comprising:
        an unserviceable kernel-mode component that directly interfaces with an operating system (OS) kernel of the computing device and hooks into a security callback function of the OS kernel so that the security callback function points to the unserviceable kernel-mode component in a first level of indirection, wherein the unserviceable kernel-mode component is a pinned component; and
        a serviceable kernel-mode component that indirectly interfaces with the OS kernel via the unserviceable kernel-mode component in a second level of indirection to receive events, or data related thereto, from the OS kernel via the unserviceable kernel-mode component and to process the events, or the data related thereto, to determine whether execution of a process on the computing device is permitted to continue;
    receiving, by the computing device, a software upgrade to upgrade the serviceable kernel-mode component;
    installing the software upgrade to load a new version of the serviceable kernel-mode component;
    determining that the new version of the serviceable kernel-mode component is no longer in use; and
    in response to the determining that the new version of the serviceable kernel-mode component is no longer in use, deactivating the unserviceable kernel-mode component.

16. The one or more non-transitory computer-readable media of claim 15, wherein the receiving the software upgrade and the installing the software upgrade to load the new version of the serviceable kernel-mode component is performed without recompiling the OS kernel.

17. The one or more non-transitory computer-readable media of claim 15, the actions further comprising:

invoking, by the OS kernel, the security callback function in response to the execution of the process on the computing device;

receiving, based at least in part on the security callback function, a query at the unserviceable kernel-mode component from the OS kernel;

accessing, by at least one of the unserviceable kernel-mode component or the new version of the serviceable kernel-mode component, and from a security module implementation of the OS kernel, security policies of the OS kernel;

receiving the query at the new version of the serviceable kernel-mode component from the unserviceable kernel-mode component; and returning, by the new version of the serviceable kernel-mode component, a response to the query indicating whether the execution of the process is permitted to continue, wherein the security policies are factored into an analysis for determining whether the execution of the process is permitted to continue.

18. The one or more non-transitory computer-readable media of claim 17, wherein the query comprises a security callback query.

19. The one or more non-transitory computer-readable media of claim 15, wherein the new version of the serviceable kernel-mode component comprises a driver for the security agent, the security agent configured to monitor activity on the computing device based at least in part on security callback queries received from the OS kernel via the unserviceable kernel-mode component.

20. The one or more non-transitory computer-readable media of claim 17, wherein the security policies are accessed by the new version of the serviceable kernel-mode component:

after the receiving of the query at the new version of the serviceable kernel-mode component; and indirectly interfacing with the security module implementation via the unserviceable kernel-mode component.

* * * * *